(12) United States Patent
Matsuo (10) Patent No.: US 6,477,331 B2
(45) Date of Patent: Nov. 5, 2002

(54) CAMERA WITH DATA EXPOSURE FUNCTION

(75) Inventor: Naoki Matsuo, Hachioji (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/767,116

(22) Filed: Jan. 22, 2001

(65) Prior Publication Data

US 2001/0010763 A1 Aug. 2, 2001

(30) Foreign Application Priority Data

Jan. 26, 2000 (JP) .......................... 2000-017401

(51) Int. Cl.$^7$ .............................................. G03B 17/24
(52) U.S. Cl. ....................................................... 396/318
(58) Field of Search ................................. 396/315, 406, 396/318, 319; 354/106

(56) References Cited

U.S. PATENT DOCUMENTS

| | | | | |
|---|---|---|---|---|
| 5,469,237 A | * | 11/1995 | Itoh et al. ........................ | 355/40 |
| 5,548,361 A | * | 8/1996 | Soshi et al. ..................... | 396/310 |
| 5,568,070 A | * | 10/1996 | Osaki et al. ..................... | 326/113 |
| 5,784,465 A | * | 7/1998 | Fujiwara ......................... | 381/10 |
| 5,784,659 A | * | 7/1998 | Okumura ........................ | 355/75 |
| 5,815,538 A | * | 9/1998 | Grell et al. ..................... | 342/413 |
| 5,862,421 A | * | 1/1999 | Suzuki et al. ................... | 396/318 |
| 5,945,828 A | * | 8/1999 | Katogi et al. ................ | 123/406.27 |
| 5,952,888 A | * | 9/1999 | Scott ............................. | 327/147 |
| 5,999,848 A | * | 12/1999 | Gord et al. ..................... | 607/2 |
| 6,188,848 B1 | * | 2/2001 | Takahashi ....................... | 396/315 |

\* cited by examiner

*Primary Examiner*—Russell Adams
*Assistant Examiner*—D. Ben Esplin
(74) *Attorney, Agent, or Firm*—Frishauf, Holtz, Goodman & Chick, P.C.

(57) ABSTRACT

This invention provides a camera with a data exposure function comprising: a dot LED; a film winding mechanism provided with a film feeding motor; a film winding operation detecting portion for outputting a motor pulse signal corresponding to a rotation of the film feeding motor; a perforation detecting portion for detecting a perforation to output a perforation signal; and a main microcomputer for determining a lighting interval pulse by counting the number of motor pulses during detection of plural perforations, calculating a correction time corresponding to a decimal portion of the lighting interval pulse with reference to the period of a motor pulse signal and controlling a lighting interval of the dot LED based on an integer portion of the lighting interval pulse and the correction time.

15 Claims, 6 Drawing Sheets

| PRNP | REGISTER FOR STORING DATA RELATING TO TIMING FOR START OF DATA EXPOSURE |
|---|---|
| PNLG | REGISTER FOR STORING DATA RELATING TO DATA INTERVAL |
| DOTPLS1~4 | REGISTER FOR STORING DATA RELATING TO ON INTERVAL OF LED |
| MPICNT | REGISTER FOR STORING A NUMBER OF MOTOR PI SIGNAL GENERATED DURING DETECTION OF TWO PARTICULAR PERFORATIONS AT THE TIME OF LAST ONE FRAME WINDING |
| K1 | COEFFICIENT FOR CALCULATION OF TIMING FOR START OF DATA EXPOSURE |
| K2 | COEFFICIENT FOR CALCULATION OF DATA INTERVAL |
| K3 | COEFFICIENT FOR CALCULATION OF LED ON INTERVAL |
| Te | DATA FOR USE FOR DETERMINATION AT THE TIME OF REWIND |
| MTPI CYCLE MEASURING TIMER | TIMER FOR MEASURING TIME CONSUMED FOR DETECTION OF A PREDETERMINED MTPI PULSE ※(MTPI CYCLE) = (TIME CONSUMED FOR DETECTION OF PREDETERMINED MTPI PULSE) / (PREDETERMINED MTPI PULSE) |
| PI COUNTER | COUNTER FOR COUNTING THE NUMBER OF MOTOR PI SIGNALS |
| PERFORATION COUNTER | COUNTER FOR COUNTING A NUMBER OF PERFORATION AT THE TIME OF ONE FRAME WINDING |

CAMERA WITH DATA EXPOSURE FUNCTION

This application claims the benefit of Japanese Application No. 2000-017401 filed in Japan on Jan. 26, 2000, the contents of which are incorporated herein by this reference.

BACKGROUND OF THE INVENTION

1. Field of the Invention

The present invention relates to a camera with a data exposure function and more particularly to a camera with a data exposure function capable of exposing data such as date data when a film frame is wound up.

2. Related Art Statement

Conventionally, a camera with a data exposure function has been proposed in which dot-matrix like data is exposed to a film face by lighting plural light emission devices a plurality of times during feeding of a film. Such a camera with a data exposure function is an example disclosed in, for example, Japanese Patent Application Laid-Open No. HEI7-319048.

In the camera with a data exposure function disclosed in the same publication, the number of pulse signals generated with a rotation of a film feeding motor is stored corresponding to a predetermined film feeding amount. Next, a time necessary for counting the number of pulse signals corresponding to the rotation of a film feeding motor is measured and a film feeding time corresponding to a predetermined film feeding amount is calculated. As a result, a lighting interval of the light emission device is controlled by the calculated time.

However, in the camera disclosed in the aforementioned Japanese Patent Application Laid-Open No. HEI7-319048, because the film feeding time corresponding to the predetermined film feeding amount is calculated and the lighting interval of the light emission devices is controlled in accordance with this calculated time, if the film is jammed during data exposure, an error in lighting interval may be generated. At this time, the shape and dimension of data exposed to the film become inaccurate.

OBJECTS AND SUMMARY OF THE INVENTION

An object of the present invention is to provide a camera with a data exposure function capable of exposing data to the film surface with small error in shape and dimension thereof.

To achieve the above object, according to an aspect of the present invention, there is provided a camera with a data exposure function for exposing data relating to characters, numerals or symbols by lighting a plurality of light emission devices interlockingly with a film feeding operation thereof, comprising: a film feeding motor; a motor pulse signal output portion for outputting a motor pulse signal with rotation of the film feeding motor; a perforation detecting portion for detecting a perforation provided in the film so as to output a perforation signal; a counting portion for counting the number of the motor pulse signals generated since a perforation is detected by the perforation detecting portion until another perforation is detected; a determining portion for determining a lighting interval pulse for controlling at least a lighting interval of the light emission device based on a value counted by the counting portion; a motor pulse period measuring portion for measuring a period of the motor pulse signal; a correction time calculating portion for calculating a correction time corresponding to a decimal portion of the lighting interval pulse based on the decimal portion of the lighting interval pulse and a motor pulse period measured by the motor pulse period measuring portion; and a control portion for controlling a lighting interval of the light emission device using an integer portion of the lighting interval pulse determined by the determining portion and the correction time calculated by the correction time calculating portion.

According to another aspect of the present invention, there is provided a camera with a data exposure function comprising: a data exposure portion including plural light emission devices disposed in a direction perpendicular to a film feeding direction; a film feeding portion for winding a film after exposure by a frame by controlling a film feeding motor; a motor pulse signal outputting portion for outputting a motor pulse signal corresponding to a rotation amount accompanied by the rotation of the film feeding motor; a perforation detecting means for detecting a perforation provided in the film to output a perforation signal; a counting portion for counting the number of the motor pulse signals in a period in which particular two perforations are detected by the perforation detecting portion; a determining portion for determining a lighting interval pulse for controlling a lighting interval of the light emission device based on a value counted by the counting portion; a correction time calculating portion for calculating a correction time corresponding to a decimal portion of the lighting interval pulse determined by the determining portion with reference to a period of the motor pulse signal; and a control portion for exposing data relating to characters, numerals or symbols to the film by controlling a lighting interval of the light emission devices in the data exposure means, based on an integer portion of the lighting interval pulse determined by the determining portion and a correction time calculated by the correction time calculating portion.

According to still another aspect of the present invention, there is provided a data exposure method of a camera with a data exposure function for exposing data relating to characters, numerals or symbols by lighting a plurality of light emission devices interlockingly with a film feeding operation thereof, comprising: a step of outputting a motor pulse signal with a rotation of a film feeding motor; a step of detecting a perforation provided in the film; a step of counting the number of the motor pulse signals in an interval since a predetermined perforation is detected until a subsequent perforation is detected; a step of measuring the period of the motor pulse signal; a step of determining a lighting interval pulse for controlling a lighting interval of the light emission device based on the counted value; a step of calculating a correction time corresponding to a decimal portion of the lighting interval pulse by calculating the decimal portion of the lighting interval pulse and the period of the motor pulse signal; and a step of controlling the lighting interval of the light emission devices using an integer portion of the determined lighting interval pulse and the correction time.

These objects and advantages of the present invention will become further apparent from the following detailed explanation.

DETAILED DESCRIPTION OF THE PREFERRED EMBODIMENTS

Hereinafter, preferred embodiments of the present invention will be described with reference to the accompanying drawings.

Figure 1:
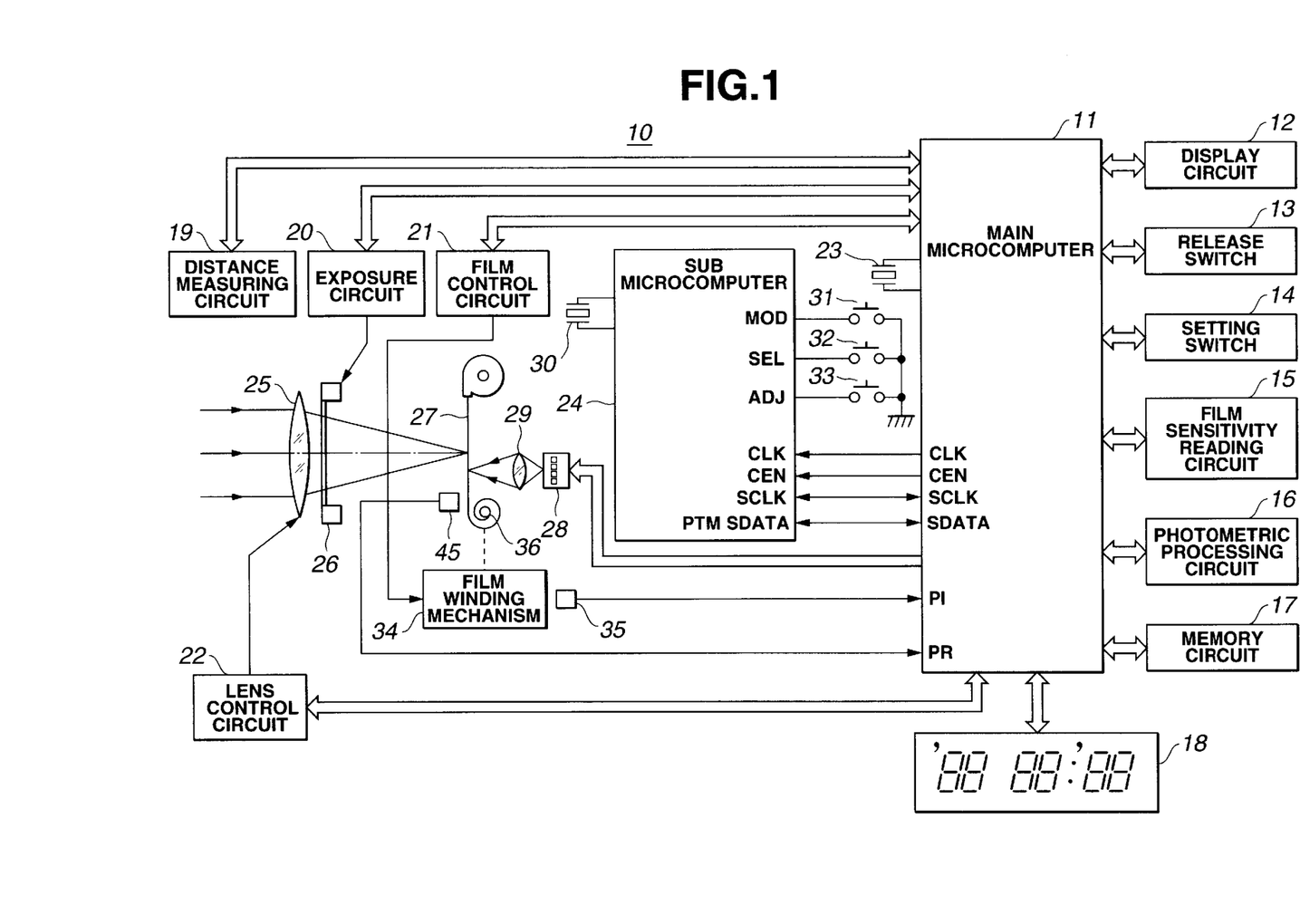
FIG. 1 is a block diagram showing a structure of a camera with a data exposure function according to an embodiment of the present invention.
Figure 2:
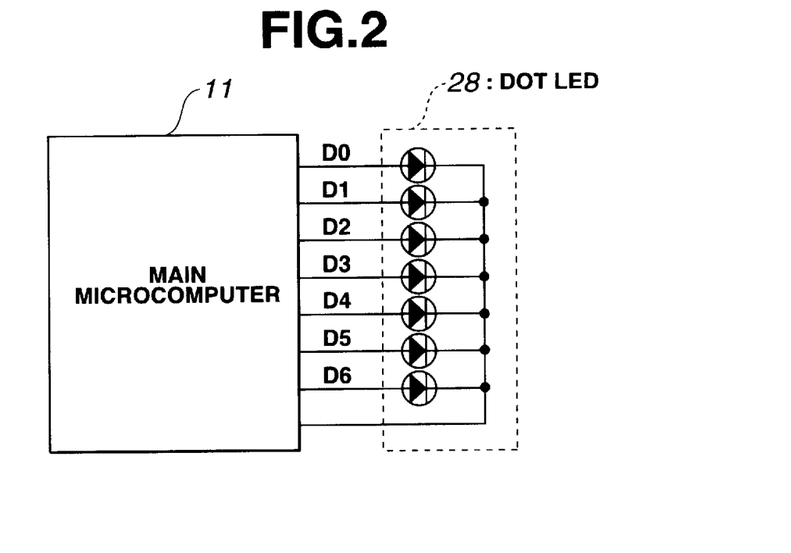
FIG. 2 is a circuit diagram showing a structure of a dot LED according the embodiment.
Figure 3:
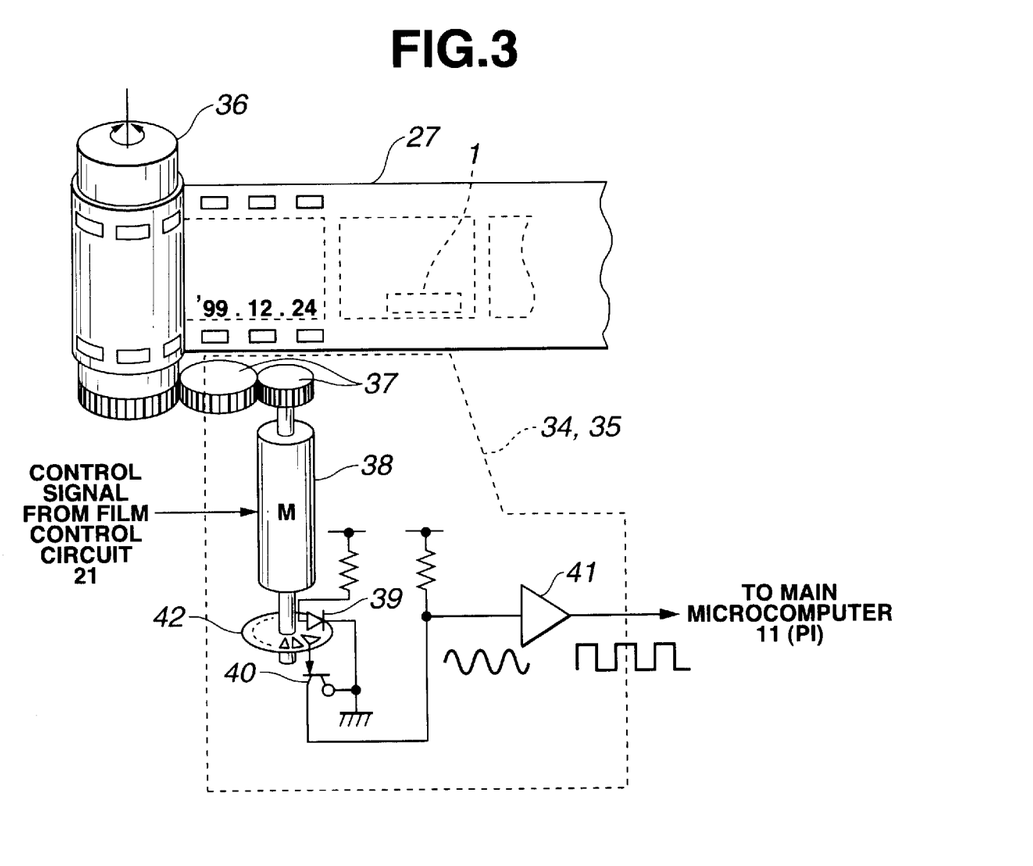
FIG. 3 is a diagram showing structures of a film winding mechanism and film winding operation detecting portion of the embodiment.
Figure 4:
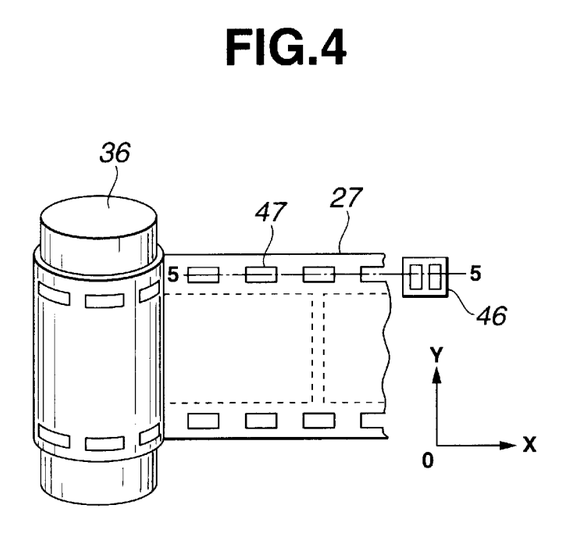
FIG. 4 is a perspective view showing a detailed structure of a perforation detecting portion of the embodiment.
Figure 5:
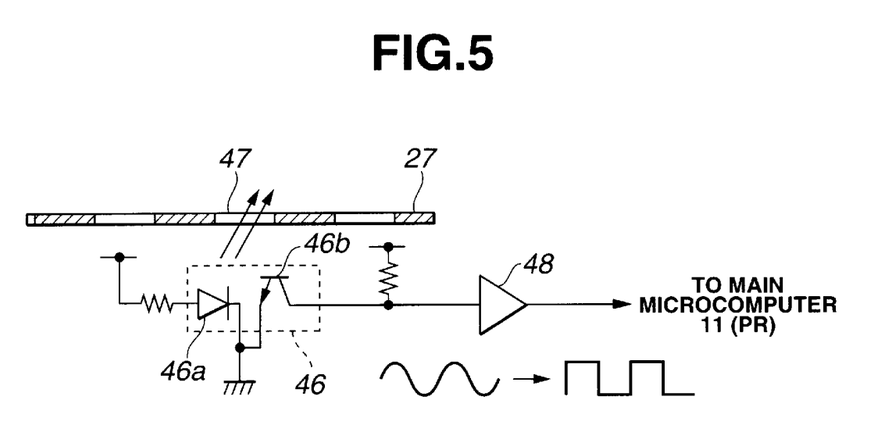
FIG. 5 is a circuit diagram containing its partial section showing a detailed structure of the perforation detecting portion of the embodiment.
Figure 6:
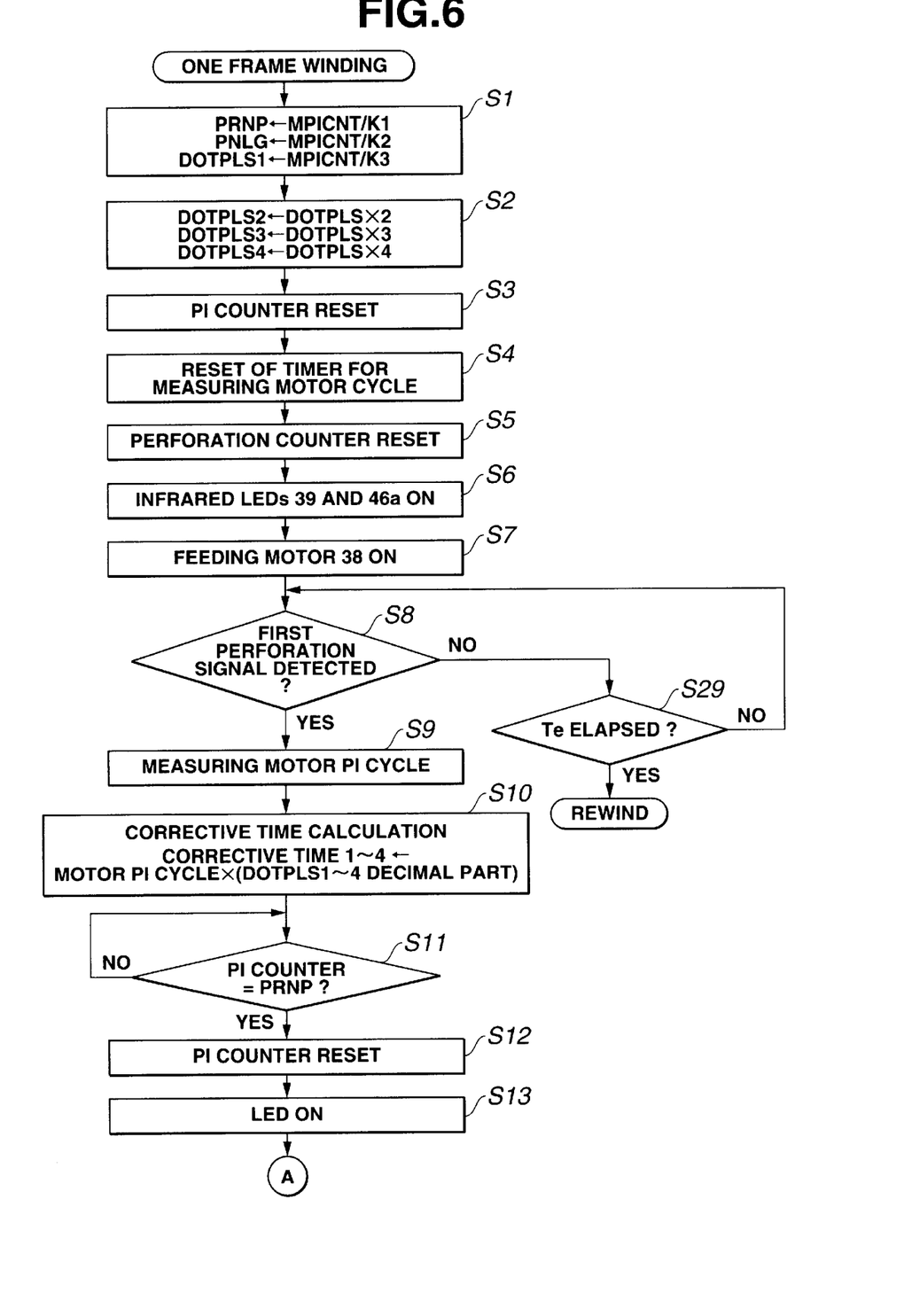
FIG. 6 is a flow chart showing a part of operation upon one frame winding in the camera with a data exposure function of the embodiment.
Figure 7:
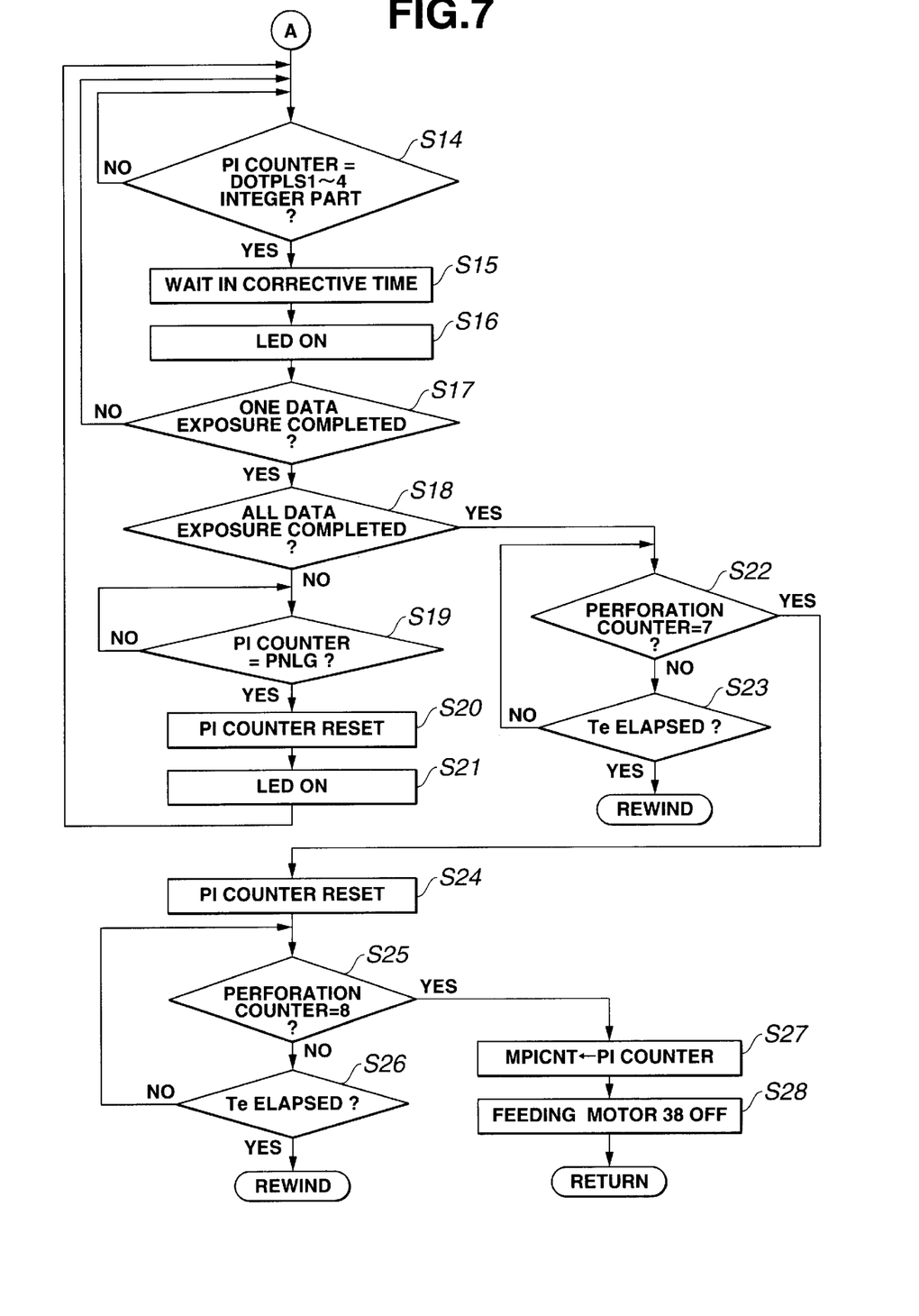
FIG. 7 is a flow chart showing another part of operation upon one frame winding in the camera with a data exposure function of the embodiment.
Figure 8:
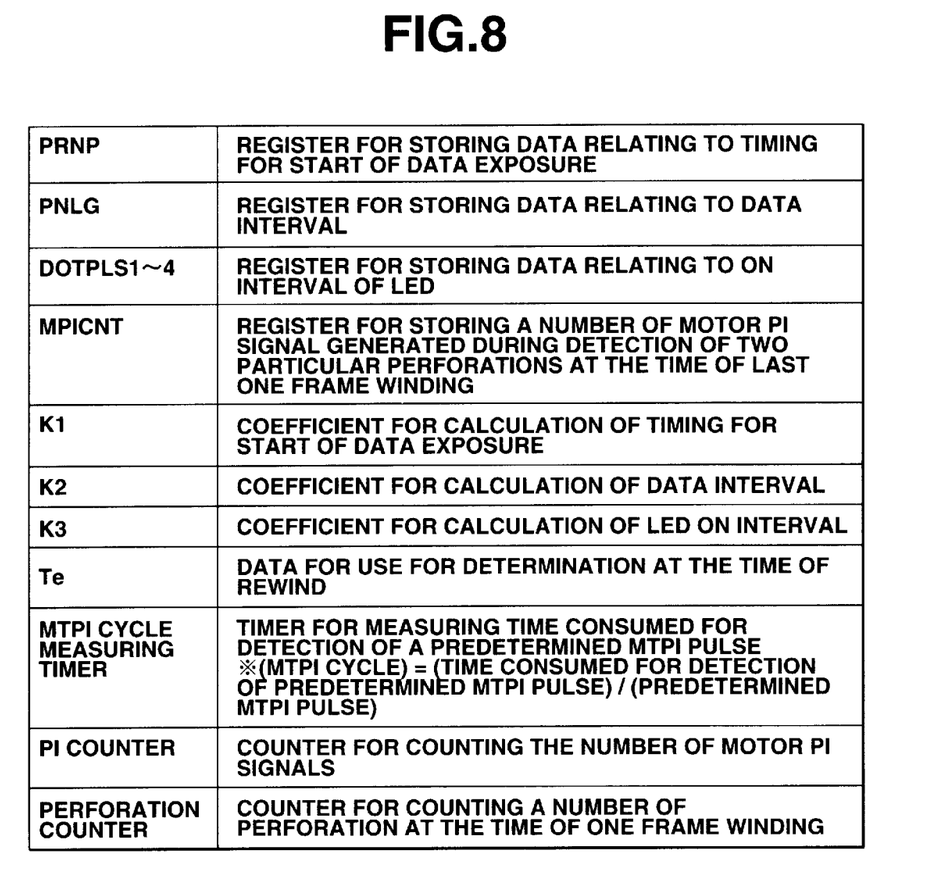
FIG. 8 is a diagram showing roles of respective registers, counters and timers in the camera with a data exposure function of the embodiment.

FIGS. 1–8 show an embodiment of the present invention. FIG. 1 is a block diagram showing a structure of a camera with a data exposure function. FIG. 2 is a circuit diagram showing a structure of a dot LED. FIG. 3 is a diagram showing structures of a film winding mechanism and a film winding operation detecting portion. FIG. 4 is a perspective view showing a detailed structure of a perforation detecting portion. FIG. 5 is a circuit diagram containing its partial section showing a detailed structure of the perforation detecting portion. FIG. 6 is a flow chart showing a part of operation upon one frame winding in the camera with a data exposure function. FIG. 7 is a flow chart showing other part of operation upon one frame winding in the camera with a data exposure function. FIG. 8 is a diagram showing roles of respective registers, counters and timers in the camera with a data exposure function.

As shown in FIG. 1, the camera with a data exposure function 10 of the embodiment comprises: an indication circuit (display circuit) 12 for indicating a camera operation mode, exposure data, a frame number and the like; a release switch 13 comprised of a two-release stroke switch which carries out distance measuring action when the first release switch is turned ON (that is, pressed down) and carries out exposure action when the second release switch is turned ON; a setting switch 14 for setting a camera operation mode; a film sensitivity reading circuit 15 for reading DX code information and the like recorded in a film 27, which will be described later, and sending its SV value signal to a main microcomputer 11, which will be described later; a photometric processing circuit 16 for measuring luminance of an object; a memory circuit 17 comprised of a nonvolatile memory for storing data such as a film frame number, a camera operation mode and the like required to be stored even if the power is turned OFF; a date indication circuit 18 for indicating data based on data sent from a submicrocomputer 24, which will be described later; a photometric circuit (distance measuring circuit) 19 for supplying data necessary for measuring a distance up to an object to the main microcomputer 11; a photographic lens 25 for forming an image of the object on the surface of a film 27; a lens shutter 26 having a diaphragm function for controlling a passage area when light from this photographic lens 25 reaches the film 27 and a shutter function for controlling a passage time; an exposure circuit 20 for controlling this lens shutter 26 to make an appropriate exposure action; a spool 36 for winding the film 27 after taking a picture; a film winding mechanism 34 which is a film feeding means for rotating this spool 36; a film control circuit 21, which is a feeding means for making the film 27 automatically wound by controlling the film winding mechanism 34; a film winding operation detecting portion 35, which is a motor pulse signal output means for outputting a pulse signal corresponding to a rotation of a feeding motor 38 (see FIG. 3) which will be described later, contained in the film winding mechanism 34, to the main microcomputer 11; a perforation detecting portion 45, which is a perforation detecting means for detecting a perforation in the film 27 and outputting its detection signal to the main microcomputer 11; a lens control circuit 22 for driving the photographic lens 25 so as to form an image of the object on the film 27 based on a control signal from the main microcomputer 11; an oscillator 30 for always transmitting an operation clock; the submicrocomputer 24 for counting the clock of the oscillator 30 to create date data comprised of "year", "month", "day", "hour", "minute" for exposuring on the film 27 and the like and sending it to the main microcomputer 11; a dot LED, 28 (see FIG. 2) which is a light emission device for emitting light based on a control signal from the main microcomputer 11 and a data exposure means; an exposure lens 29 for collecting light emitted from the dot LED 28 to a predetermines position on the film 27; a mode switch (MOD) 31 which is connected to the submicrocomputer 24 and allows a desired exposure mode to be selected or desired exposure data to be corrected when a photographer operates it while recognizing selection or correction of an exposure mode indicated on the date indication circuit 18; a selector switch (SEL) 32; an adjusting (ADJ) switch 33, an oscillator 23 for generating an operation clock; and the main microcomputer 11, which is a control means for carrying out sequence control for the entire camera system and arithmetic operation and acts as a counting means, motor pulse period measuring means, deciding means, correction time computing means and control means, connected to the indication circuit 12, release switch 13, setting switch 14, film sensitivity reading circuit 15, photometric processing circuit 16, memory circuit 17, date indication circuit 18, distance measuring circuit 19, exposure circuit 20, film control circuit 21 and lens control circuit 22 through buses to control them, this main microcomputer being operated by receiving the clock signal from the oscillator 23 and being connected to the aforementioned sub microcomputer 24 through various signal lines such as CLK, CEN, SCLK, SDATA.

The film 27 contained in, for example, a film cartridge or the like is loaded detachably in the camera 10 with a data exposure function.

The dot LED 28 and the exposure lens 29 are disposed near the film winding mechanism 34 to allow data exposure from a frame end in front of each photographic frame on a film surface. This data exposure action is a well known technology which is carried out by lighting the dot LED 28 a plurality of times per data according to an exposure signal from the main microcomputer 11 during film feeding.

As shown in FIG. 2, the dot LED 28 contains for example, seven LEDs connected to terminals D0–D6 of the main microcomputer 11.

Next, specific structures of the film winding mechanism 34 and the film winding operation detecting portion 35 will be described with reference to FIG. 3.

In the spool 36, a gear portion formed on an end meshes with a gear string 37 and a gear at the other end of the gear string 37 is fixed to a rotation shaft of the feeding motor 38, which is a film feeding motor.

On the other hand, a PI blade 42 is attached to an end of the driving shaft opposite to the gear in the gear string 37 such that it is rotatable integrally with the driving shaft. This PIblade 42 includes a plurality of holes formed at predetermined pitches in the circumferential direction of its disc member.

An infrared LED 39 is disposed at a predetermined position over some hole in the PI blade 42. On the other hand, a photo transistor 40 is disposed at a predetermined position below the hole opposing the infrared LED 39. An output of this photo transistor 40 is connected to the main microcomputer 11 through a waveform shaping circuit 41 which shapes the waveform to rectangular waves.

In this way, a photo-interrupter (PI) which detects presence or absence of the hole in the PI blade 42 by a rotation of the feeding motor 38 is constructed.

With such a structure, if a driving signal is supplied from the film control circuit 21 to the feeding motor 38, the feeding motor 38 rotates its driving shaft and then rotates the spool 36 through the gear string 37. Consequently, the film 27 is wound up.

At the same time as this film winding operation, the aforementioned PI blade 42 is rotated. If the hole moves, infrared rays emitted from the infrared LED 39 are sent to the photo-transistor 40 or interrupted repeatedly. By this operation, a waveform signal is outputted from the photo-transistor 40 and is transmitted to the aforementioned waveform shaping circuit 41.

The waveform shaping circuit 41 shapes the received waveform to a pulse signal (that is, motor PI signal) corresponding to an action of the spool 36 and outputs it to the main microcomputer 11. This motor PI signal is counted by a first counter (not shown) in the main microcomputer 11. This counter is an independent counter which counts regardless of a programmed action if the main microcomputer 11 permits the counting operation.

The main microcomputer 11 controls the film control circuit 21 based on the obtained pulse signal from the film winding operation detecting portion 35 so as to control automatic winding of the film. A data exposure region to be recorded on the film 27 accompanied by this automatic winding of the film is a portion indicated by reference numeral 1 of FIG. 3 and a photographing date, for example, "'99.12.24" is exposed as a latent image on an already exposed frame (although the date is indicated for convenience of understanding, actually, it cannot be recognized visually until the film is developed).

Next, a detailed structure of the perforation detecting portion 45 will be described with reference to FIGS. 4 and 5.

As shown in FIG. 4, a plurality of perforations 47 are provided along the feeding direction (X-axis direction) of the film at both top and bottom ends in the Y-axis direction of the film 27. A photo-reflector 46 is a sensor for sensing the perforations 47 and is disposed to detect a perforation 47 disposed at the top end of the film such that it opposes it as shown in the same Figure.

FIG. 5 shows a film section taken along the dot and dash line 5—5 of FIG. 4 and a detailed circuit of the perforation detecting portion 45 as shown in FIG. 1.

The aforementioned photo-reflector 46 comprises an infrared LED 46a and a photo-transistor 46b. An output of the photo-transistor 46b is connected to the main microcomputer 11 through the waveform shaping circuit 48 which shapes the waveform to a rectangular wave.

With such a structure, if the infrared LED 46a emits light to the film 27, when a film portion opposes it, infrared light is reflected by that film portion 27. This reflected beam is received by the photo-transistor 46b, so that, for example, a high level signal is outputted corresponding to light quantity.

On the other hand, if the perforation 47 in the film 27 is located at an infrared beam projection position of the infrared beam, for example, a low-level signal is outputted from the photo-transistor 46b because the infrared beam is not reflected.

The waveform signal (perforation signal) of the photo-transistor 46b accompanied by such a feeding action for the film 27 is shaped to the rectangular wave as shown in the same Figure by the waveform shaping circuit 48 and sent to the main microcomputer 11.

When character information and the like are recorded on the film 27 in the camera 10 with a data exposure function having such a structure, the following operation is carried out.

During one frame winding after an exposure cation is finished, the dot LED 28 emits light so as to record plural characters, numerals or symbols represented by year, month, day data on the film 27. At that time, light emission timing is basically decided according to the motor PI signal outputted from the aforementioned film winding operation detecting portion 35 and a portion short of resolution of this motor PI signal is compensated by time.

As the final frame of the film 27 is reached, the number of occurrences of the motor PI signal when one frame is wound is decreased (a main reason for this phenomenon is that as the final frame of the film is reached, the spool 36 becomes thicker by the winding so that the feeding speed of the film 27 is increased). Therefore, any device for this phenomenon is necessary.

Thus, in the camera 10 with a data exposure function, how many motor PI signals were generated to feed a predetermined amount of the film in a previous film feeding action is stored and held. Based on that stored information, the data exposure start position, exposure interval and dot LED emission interval for this time are decided. At the same time, a motor PI signal period is measured in the film feeding action of this time and the portion short of the resolution of the motor PI signal is compensated by a correction time calculated according to the aforementioned calculated motor PI signal period are used to determine the dot LED emission interval so as to control light emission.

More specifically, in the camera 10 with a data exposure function, when one frame winding action is carried out, the motor PI signal generated after a particular perforation is detected until a next perforation is detected is counted and stored. In a data exposure action for a next photographic frame, that stored counter value is divided by a predetermined value and then, the data exposure start position and data interval are determined according to a motor PI corresponding to that value obtained in the above division. The dot LED emission interval is determined by the above calculated motor PI signal integer part and the correction time obtained by multiplying the motor PI period by the motor PI signal decimal part. Then, the data exposure action is carried out according to the above obtained data.

Next, FIGS. 6 and 7 show flow charts of one frame winding operation of the camera 10 with a data exposure function. For convenience of representation, two flow charts are provided separately. Roles of various registers, counters and timers for use in the description of FIGS. 6 and 7 are summarized in a list of FIG. 8.

If "one frame winding" routine is called by a main routine of a camera sequence (not shown), the processing is carried out in the following order.

Coefficient K1 represents calculation of a data exposure start timing, coefficient K2 represents calculation of a data interval and coefficient K3 represents calculation of a LED emission interval. A value of register MPICNT is divided by each of coefficient K1, coefficient K2 and coefficient K3. Each of the calculations results is stored in a register PRNP for storing data relating to the data exposure start timing, a register PNLG for storing data relating to the data interval and a register DOTPLS1 for storing data relating to the LED emission interval (step S1).

Next, assuming that the LED is lit five times to form one piece of data, dot LED lighting timing is calculated and its result is stored in each of register DOTPLS2, DOTPLS3, DOTPLS4 (step S2).

After that, the PI counter is reset (step S3), the MTPI period measuring timer is reset (step S4), and the perforation counter is reset (step S5).

Then, the infrared LED 39 and infrared LED 46a are lit (step S6) so as to make the motor PI signal and perforation signal detectable and then, the feeding motor 38 is turned ON to start film feeding (step S7).

Detection for a first perforation signal is executed (step S8) and if that signal is not detected after a predetermined time Te elapses (step S29), it is determined that a film end has been already reached or the film cannot be fed for some reason. Then, the processing proceeds to rewinding action.

On the other hand, if the first perforation signal is detected, a time for measuring a predetermined number of pulses of the motor PI signal is measured by means of a motor PI period measuring timer. The following division is carried out to calculate a motor PI signal period (step S9): motor PI period=(measured time)/(predetermined number of pulses).

After that, the time for correction of the dot LED lighting timing is calculated by multiplying the motor PI period by the decimal part of DOTPLS1-4 (step S10).

Then the PI counter is compared to the register PRNP value (step S11) and the processing waits until they become equal. After they become equal, the processing proceeds to the next step S12.

The PI counter is reset (step S12) and the LED is lit for a predetermined time (step S13). The PI counter is compared to the integer part of the DOTPLS1-4 (step S14). After they become equal, the processing proceeds to the next step S15. The reason is that because the dot LED is lit five times to form one data, it needs to be lit a remaining four times.

After that, the processing waits for a correction time (step S15). The reason is that because resolution is short if only motor PI pulses are provided, this is corrected by the correction time.

Then, the dot LED 28 is lit for a predetermined time (step S16) so as to confirm whether or not one piece of data exposure (that is, data exposure corresponding to one character in case of character data) is finished (step S17). Otherwise, the processing proceeds to the aforementioned step S14, and the processing waits for end.

If one piece of data exposure is finished, whether or not all data exposure (that is, all character exposure in case where the character data is comprised of plural characters) is finished is verified (step S18).

Otherwise, the processing waits until the PI counter becomes equal to the register PNLG value (step S19) and when they become equal, the PI counter is reset (step S20).

After that, the LED is lit for a predetermined time (step S21) and then, the processing returns to the aforementioned step S14. Then, the above described operations are carried out again.

On the other hand, if exposure of all data is finished in the aforementioned step S18, whether or not the perforation counter indicates "7" is determined (step S22). Unless it indicates "7" after a predetermined time Te elapses (step S23), it is determined that it is a film end or the film cannot be fed and then the processing proceeds to the rewinding operation.

If the perforation counter indicates "7" in the aforementioned step S22, the PI counter is reset (step S24) and then whether or not the perforation counter indicates "8" is determined (step S25).

If the perforation counter does not change to "8" after a predetermined time Te elapses (step S26), it is determined that it is a film end or the film cannot be fed and the processing proceeds to rewinding processing.

If the counter indicates "8" in the aforementioned step S25, it comes that film feeding by one frame has been finished. Therefore, a content of the PI counter is entered into the MPICNT (step S27), the feeding motor 38 is turned OFF (step S28) and then the processing is returned to the main routine.

If a motor PI signal and a perforation signal are generated accompanied by film feeding, the PI counter and perforation counter, which are hard counters, execute a counting operation irrespective of the operation sequence of the main microcomputer 11. Therefore, when comparison in steps S11, S14 and S19 is carried out, a new count value can be obtained only by processing to read out a corresponding counter value.

Although according to the above described embodiment, the motor PI period is calculated by measuring a time necessary for measuring a predetermined number of pulses by means of a motor PI period measuring timer, it can be calculated by measuring a motor PI pulse count generated for a predetermined time interval.

Although according to this embodiment, a current light emission timing is determined based on a previous count value, if the data exposure start position is after a first perforation and the film feeding speed is stabilized, it is permissible to determine the light emission timing according to the current count value.

According to this embodiment, because the dot LED light emission is controlled using a motor pulse corresponding to the film feeding amount, character data having a low disparity in shape and dimension can be exposed on the film. Further, because a portion short of resolution is corrected by time basis in the motor pulse at this time, an accuracy of exposure data can be secured. As a result, the accuracy of exposure data can be secured.

In this invention, it is apparent that working modes different in a wide range can be formed on the basis of this invention without departing from the spirit and scope of the invention. This invention is not restricted by any specific embodiment except being limited by the appended claims.

What is claimed is:

1. A camera with a data exposure function for exposing data relating to characters, numerals or symbols by lighting a plurality of light emission devices interlockingly with a film feeding operation, comprising:

a film feeding motor;

a motor pulse signal output portion for outputting a motor pulse signal according to rotation of said film feeding motor;

a perforation detecting portion for detecting a perforation provided in said film to output a perforation signal;

a counting portion for counting the number of motor pulse signals generated after a perforation is detected by said perforation detecting portion until another perforation is detected;

a determining portion for determining a lighting interval pulse for controlling at least a lighting interval of said light emission devices based on a value counted by said counting portion;

a motor pulse period measuring portion for measuring a period of said motor pulse signal;

a correction time calculating portion for calculating a correction time corresponding to a decimal portion of said lighting interval pulse based on the decimal portion of said lighting interval pulse and a motor pulse period measured by said motor pulse period measuring portion; and a control portion for controlling a lighting interval of said light emission devices using an integer portion of the lighting interval pulse determined by said determining portion and the correction time calculated by said correction time calculating portion.

2. A camera with a data exposure function as claimed in claim 1 wherein the determining portion determines a light emission start pulse for controlling a light emission start position of said light emission device based on said counted value.

3. A camera with a data exposure function as claimed in claim 2 wherein the determining portion determines the light emission start pulse by dividing the counted value by a first coefficient.

4. A camera with a data exposure function as claimed in claim 1 wherein the determining portion determines a character interval pulse for controlling the interval of the character or the like based on the counted value.

5. A camera with a data exposure function as claimed in claim 4 wherein the determining portion determines the character interval pulse by dividing the counted value by a second coefficient.

6. A camera with a data exposure function as claimed in claim 1 wherein the determining portion determines the lighting interval pulse by dividing the counted value by a third coefficient.

7. A camera with a data exposure function as claimed in claim 1 wherein, when any perforation is not detected by the perforation detecting portion within a predetermined time, film rewinding is carried out.

8. A camera with a data exposure function as claimed in claim 1 wherein the motor pulse period measuring portion measures the motor pulse period by measuring a time necessary for counting a predetermined number of pulses.

9. A camera with a data exposure function as claimed in claim 1 wherein the motor pulse period measuring portion measures the motor pulse period by measuring the number of pulses generated within a predetermined time.

10. A camera with a data exposure function as claimed in claim 1 wherein the correction time calculating portion calculates the correction time by multiplying the motor pulse period by a decimal portion of the lighting interval pulse.

11. A camera with a data exposure function comprising:

a data exposure portion including plural light emission devices disposed in a direction perpendicular to a film feeding direction;

a film feeding portion for winding a film by a frame after exposure by controlling drive of a film feeding motor;

a motor pulse signal outputting portion for outputting a motor pulse signal corresponding to a rotation amount accompanied by the rotation of the film feeding motor;

a perforation detecting portion for detecting a perforation provided in the film to output a perforation signal;

a counting portion for counting the number of the motor pulse signals in a period in which particular two perforations are detected by the perforation detecting portion;

a determining portion for determining a lighting interval pulse for controlling a lighting interval of the light emission devices based on a value counted by the counting portion;

a correction time calculating portion for calculating a correction time corresponding to a decimal portion of the lighting interval pulse determined by the determining portion with reference to a period of the motor pulse signal; and a control portion for exposing data relating to characters, numerals or symbols to the film by controlling a lighting interval of the light emission devices in the data exposure means, based on an integer portion of the lighting interval pulse determined by the determining portion and a correction time calculated by the correction time calculating portion.

12. A camera with a data exposure function as claimed in claim 11 wherein the determining portion determines a light emission start pulse for controlling a light emission start position of the light emission devices based on the counted value.

13. A camera with a data exposure function as claimed in claim 11 wherein the determining portion determines a character interval pulse for controlling an interval of the characters or the like based on the counted value.

14. A camera with a data exposure function as claimed in claim 11 wherein the correction time is a waiting time provided before the light emission devices are lit based on the lighting interval pulse.

15. A data exposure method of a camera with a data exposure function for exposing data relating to characters, numerals or symbols by lighting a plurality of light emission devices interlockingly with a film feeding operation, comprising the steps of:

outputting a motor pulse signal with a rotation of a film feeding motor;

detecting a perforation provided in the film;

counting the number of motor pulse signals in an interval since a predetermined perforation is detected until a subsequent perforation is detected;

measuring the period of the motor pulse signal;

determining a lighting interval pulse for controlling a lighting interval of the light emission devices based on the counted value;

calculating a correction time corresponding to a decimal portion of the lighting interval pulse by calculating the decimal portion of the lighting interval pulse and the period of the motor pulse signal; and controlling the lighting interval of the light emission devices using an integer portion of the determined lighting interval pulse and the correction time.

* * * * *